US012013106B2

(12) United States Patent
Voelker

(10) Patent No.: US 12,013,106 B2
(45) Date of Patent: Jun. 18, 2024

(54) HIGH-BAY LIGHT FIXTURE THERMAL MANAGEMENT

(71) Applicant: SIGNIFY HOLDING B.V., Eindhoven (NL)

(72) Inventor: Christopher Andrew Voelker, Eindhoven (NL)

(73) Assignee: SIGNIFY HOLDING, B.V., Eindhoven (NL)

( * ) Notice: Subject to any disclaimer, the term of this patent is extended or adjusted under 35 U.S.C. 154(b) by 0 days.

(21) Appl. No.: 18/033,913

(22) PCT Filed: Oct. 29, 2021

(86) PCT No.: PCT/EP2021/080162
§ 371 (c)(1),
(2) Date: Apr. 26, 2023

(87) PCT Pub. No.: WO2022/090486
PCT Pub. Date: May 5, 2022

(65) Prior Publication Data

US 2023/0408079 A1 Dec. 21, 2023

Related U.S. Application Data

(60) Provisional application No. 63/108,605, filed on Nov. 2, 2020.

(30) Foreign Application Priority Data

Nov. 10, 2020 (EP) .................................... 20206786

(51) Int. Cl.
*F21V 29/71* (2015.01)
*F21S 8/06* (2006.01)
(Continued)

(52) U.S. Cl.
CPC .............. *F21V 29/717* (2015.01); *F21S 8/06* (2013.01); *F21V 17/12* (2013.01); *F21V 23/008* (2013.01);
(Continued)

(58) Field of Classification Search
CPC ....... F21V 29/71; F21V 29/713; F21V 29/717
See application file for complete search history.

(56) References Cited

U.S. PATENT DOCUMENTS 10,145,553 B1 * 12/2018 Richardson ............. F21V 29/83
2013/0301275 A1 11/2013 Kim
(Continued)

FOREIGN PATENT DOCUMENTS

| | | | |
|---|---|---|---|
| CN | 204227245 | U | 3/2015 |
| CN | 205678539 | U | 11/2016 |
| GB | 2574138 | A | 11/2019 |

*Primary Examiner* — Sean P Gramling

(57) ABSTRACT

A high bay light fixture (100) comprising multiple heat sink structures (102, 104, 106, 108) attached to an electronics housing (110), and light sources (132, 134, 136, 138) attached to the multiple heat sink structures (102, 104, 106, 108). Each heat sink structure (102, 104, 106, 108) includes a bottom wall (202) and side walls (204, 206, 208, 210) that extend up from the bottom wall (202). Each light source (132, 134, 136, 138) is attached to the bottom wall (202) of a respective heat sink structure (102, 104, 106, 108) on a surface of the bottom wall (202) facing away from the electronics housing (110). Each heat sink structure (102, 104, 106, 108) is spaced from other heat sink structures of the multiple heat sink structures (102, 104, 106, 108) that are adjacent to the heat sink structure (102, 104, 106, 108).

12 Claims, 9 Drawing Sheets

(51) Int. Cl.
*F21V 17/12* (2006.01)
*F21V 23/00* (2015.01)
*F21V 29/83* (2015.01)
*F21V 29/89* (2015.01)
*F21W 131/402* (2006.01)

(52) U.S. Cl.
CPC .............. *F21V 29/83* (2015.01); *F21V 29/89* (2015.01); *F21W 2131/402* (2013.01)

(56) References Cited

U.S. PATENT DOCUMENTS

2018/0149349 A1 5/2018 Shum
2020/0200378 A1 6/2020 Stokes et al.

* cited by examiner

HIGH-BAY LIGHT FIXTURE THERMAL MANAGEMENT

CROSS-REFERENCE TO PRIOR APPLICATIONS

This application is the U.S. National Phase application under 35 U.S.C. § 371 of International Application No. PCT/EP2021/080162, filed on Oct. 29, 2021, which claims the benefits of European Patent Application No. 20206786.4, filed on Nov. 10, 2020 and U.S. Patent Application 63/108,605, filed on Nov. 2, 2020. These applications are hereby incorporated by reference herein.

TECHNICAL FIELD

The present disclosure relates generally to lighting fixtures, and more particularly to light fixtures with thermal management structures.

BACKGROUND

Traditional high bay light fixtures include light sources and related structures as well as an electronics housing encasing one or more components that control the light sources. The dissipation of heat generated by the light sources is important for the proper operation and the life span of a high bay light fixture. In some cases, minimizing the cost of achieving efficient dissipation of heat is important to the overall cost of a high bay light fixture. Thus, a cost-effective solution that facilitates the efficient dissipation of heat generated by light sources of a high bay light fixture is desirable.

GB 2 574 138 A relates to a luminaire that includes an electrical housing assembly and a light module assembly. The light module assembly is connected to the electrical housing assembly such that an air gap is defined between the light module assembly and the electrical housing assembly. The electrical housing assembly has a variable length such that the length of the electrical housing is proportional to the number of light module assemblies connected to the electrical housing assembly. The light module assembly and the electrical housing assembly are connected by at least one module attachment arm.

US 2013/301275 A1 relates to a light emitting diode bulb that includes: a socket base configured for insertion into a light fixture; a plurality of separate heat sinks attached to the socket base; light emitting diode elements mounted on the plurality of separate heat sinks; and an optical element covering one of the light emitting diode elements.

US 2018/149349 A1 relates to an apparatus to development of a LED system with high thermal dissipation power relative to the system weight by the inclusion of open regions. The open regions reduce the weight of the optical system while improving airflow. Associated optics are described to efficiently and evenly distribute the light from an LED by tailoring the optical distribution. In addition, circuitry and methods are described to allow for the LED system to operate with existing power sources such as ballast or offline AC voltage sources or both.

US 2020/200378 A1 relates to a high bay lighting fixture includes an electronics housing and a light module that includes a light source that emits a light. The high bay lighting fixture further includes a tubular connector. The electronics housing is attached to the tubular connector at a first end of the tubular connector, and the light module is attached to the tubular connector at a second end of the tubular connector separated from the electronics housing by the tubular connector. The tubular connector provides a wireway for routing an electrical wire between the electronics housing and the light module.

SUMMARY

The present disclosure relates generally to light fixtures, and more particularly to light fixtures with auxiliary device attachment structures. In an example embodiment, a high bay light fixture includes an electronics housing, multiple heat sink structures attached to the electronics housing, and light sources attached to the multiple heat sink structures. Each heat sink structure includes a bottom wall and side walls that extend up from the bottom wall. Each light source is attached to the bottom wall of a respective heat sink structure of the multiple heat sink structures on a surface of the bottom wall facing away from the electronics housing. Each heat sink structure is spaced from other heat sink structures of the multiple heat sink structures that are adjacent to the heat sink structure.

These and other aspects, objects, features, and embodiments will be apparent from the following description and the appended claims.

BRIEF DESCRIPTION OF THE FIGURES

Reference will now be made to the accompanying drawings, where.

Figure 1B:
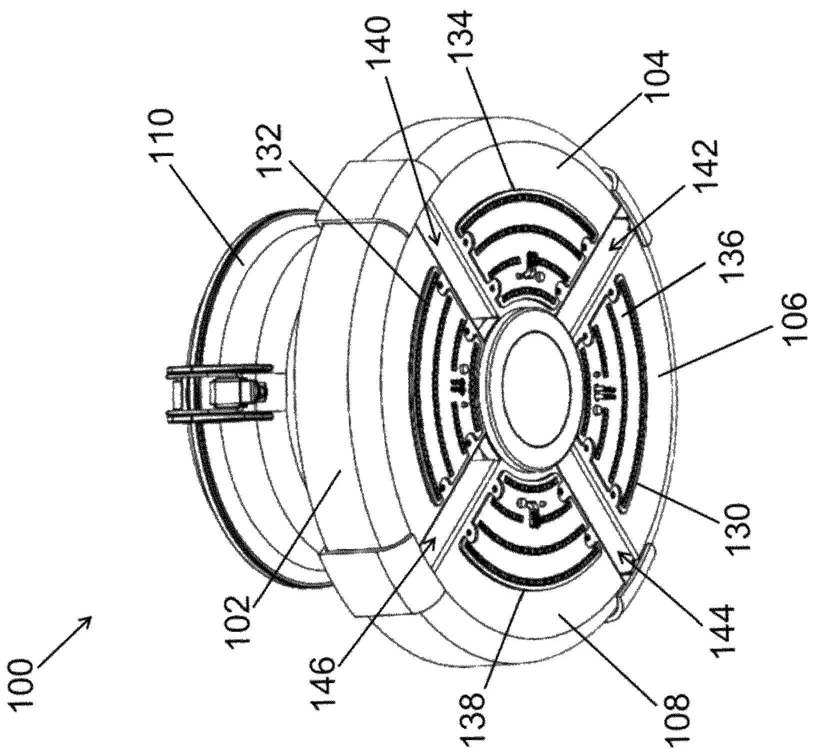
FIG. 1B illustrates a bottom perspective view of the high bay light fixture of FIG. 1A with lenses removed according to an example embodiment.

The drawings illustrate only example embodiments and are therefore not to be considered limiting in scope. The elements and features shown in the drawings are not necessarily to scale, emphasis instead being placed upon clearly illustrating the principles of the example embodiments. Additionally, certain dimensions or placements may be exaggerated to help visually convey such principles. In the drawings, the same reference numerals that are used in different drawings designate like or corresponding, but not necessarily identical elements.

DETAILED DESCRIPTION OF EXAMPLE EMBODIMENTS

In the following paragraphs, particular embodiments will be described in further detail by way of example with reference to the figures. In the description, well known components, methods, and/or processing techniques are omitted or briefly described. Furthermore, reference to various feature(s) of the embodiments is not to suggest that all embodiments must include the referenced feature(s).

Figure 1A:
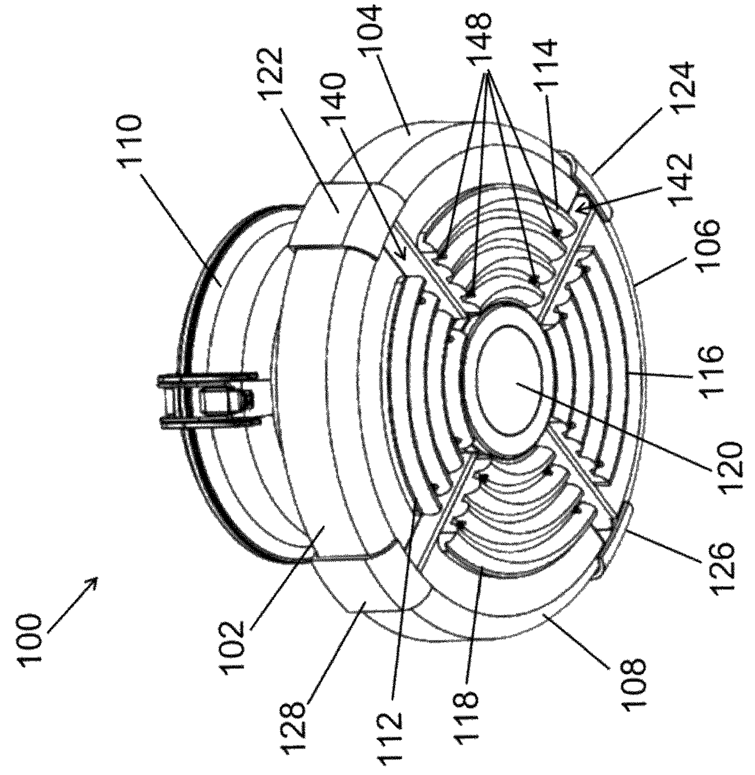
FIG. 1A illustrates a bottom perspective view of a high bay light fixture according to an example embodiment.

FIG. 1A illustrates a bottom perspective view of a high bay light fixture 100 according to an example embodiment and FIG. 1B illustrates a bottom perspective view of the high bay light fixture 100 of FIG. 1A with lenses removed according to an example embodiment. In some example embodiments, the light fixture 100 includes heat sink structures 102, 104, 106, 108. The heat sink structures 102, 104, 106, 108 may be arranged in a configuration such that the assembly of the heat sink structures 102, 104, 106, 108 has a circular outer perimeter as shown in FIGS. 1A and 1B. The light fixture 100 may further include an electronics housing 110 that contains components such as a driver. The light fixture 100 may also include light sources 132, 134, 136, and 138 that are attached to the heat sinks 102, 104, 106, and 108, respectively. For example, each light source 132, 134, 136, 138 may include light emitting diodes (LEDs) that are disposed on a circuit board. To illustrate, the light source 136 may include LEDs, such as the LED 130, that are attached to a circuit board in a desired configuration as can be readily understood by those of ordinary skill in the art with the benefit of the scope of this disclosure.

In some example embodiments, each light source 132, 134, 136, 138 may be attached to the respective heat sink structures 102, 104, 106, 108 using thermal tape as can be readily understood by those of ordinary skill in the art with the benefit of the scope of this disclosure. Heat generated by the light sources 132, 134, 136, 138 is transferred to the heat sink structures 102, 104, 106, 108 for dissipation away from the light sources 132, 134, 136, 138. To illustrate, heat generated by the light source 132 is transferred to the heat sink structure 102, heat generated by the light source 134 is transferred to the heat sink structure 104, heat generated by the light source 136 is transferred to the heat sink structure 106, and heat generated by the light source 138 is transferred to the heat sink structure 108.

In some example embodiments, the light fixture 100 includes lenses 112, 114, 116, 118 that are attached to the respective one of the heat sink structures 102, 104, 106, 108. To illustrate, the lens 112 is attached to the heat sink structure 102 and covers the light source 132, the lens 114 is attached to the heat sink structure 104 and covers the light source 134, the lens 116 is attached to the heat sink structure 106 and covers the light source 136, and the lens 118 is attached to the heat sink structure 108 and covers the light source 138. For example, the lenses 112, 114, 116, 118 may be attached to the heat sink structures 102, 104, 106, 108 using fasteners, such as fasteners 148 that extend through respective holes in the heat sink structures 104 and are used to attach the lens 114 to the heat sink structure 104. Because the light sources 132, 134, 136, 138 are positioned between the lenses 112, 114, 116, 118 and the heat sink structures 102, 104, 106, 108, the attachment of the lenses 112, 114, 116, 118 to the heat sink structures 102, 104, 106, 108 using the fasteners 148 may also retain the light sources 132, 134, 136, 138 attached to the heat sink structures 102, 104, 106, 108.

In some example embodiments, each heat sink structure 102, 104, 106, 108 is spaced from each other by a respective convection channel on two sides of the heat sink structure 102, 104, 106, 108. For example, the heat sink structure 102 is spaced from the heat sink structure 104 by a convection channel 140 and from the heat sink structure 108 by a convection channel 146. The heat sink structure 104 is spaced from the heat sink structure 102 by the convection channel 140 and from the heat sink structure 106 by a convection channel 142. The heat sink structure 106 is spaced from the heat sink structure 104 by the convection channel 142 and from the heat sink structure 108 by a convection channel 144. The heat sink structure 108 is spaced from the heat sink structure 106 by the convection channel 144 and from the heat sink structure 102 by a convection channel 146.

In some example embodiments, the light fixture 100 includes a cap 120 and gap cover pieces 122, 124, 126, 128. The cap 120 may a space cover at the center of the assembly of the heat sink structures 102, 104, 106, 108. The gap cover pieces 122, 124, 126, 128 may cover the convection channels 140, 142, 144, 146 at the outer perimeter of the heat sink structures 102, 104, 106, 108. The convection channels 140, 142, 144, 146 allow upward flows of air between adjacent ones of the heat sink structures 102, 104, 106, 108. For example, the upward flows of air through the convection channels 140, 142, 144, 146 can carry heat generated by the light sources 132, 134, 136, 138 away from the heat sink structures 102, 104, 106, 108.

In some example embodiments, the heat sink structures 102, 104, 106, 108 are made from aluminum sheet metal using a method such as stamping as can be readily understood by those of ordinary skill in the art with the benefit of the scope of this disclosure. In some example embodiments, the gap cover pieces 122, 124, 126, 128 may be made from plastic and may be, for example, snapped onto the heat sink structures 102, 104, 106, 108. In some example embodiments, the electronics housing 110 may be made from aluminum using methods such as die casting.

The use of aluminum sheet metal to make the heat sink structures 102, 104, 106, 108 may result in the efficient transfer and dissipation of heat produced by the light sources 132, 134, 136, 138. Further, in some cases, the use of aluminum sheet metal may result in reduced cost to make the light fixture 100 as compared to heat sink structures that may be made using die casting. For example, the sheet metal can have a smaller thickness than the typical minimum thickness of a die cast heat sink structure, which can result in reduced material cost.

In some alternative embodiments, the light fixture 100 may include more or fewer heat sink structures than shown in FIGS. 1A and 1B without departing from the scope of this disclosure. In some alternative embodiments, the convection channels may be wider or narrower than shown without departing from the scope of this disclosure. In some alternative embodiments, the lenses and the light sources of the light fixture 100 may have a different configuration and/or shape than shown without departing from the scope of this disclosure. In some alternative embodiments, the heat sink structures may have a different shape than shown without departing from the scope of this disclosure. For example, the heat sink structures may form a non-circular shape without departing from the scope of this disclosure.

Figure 2B:
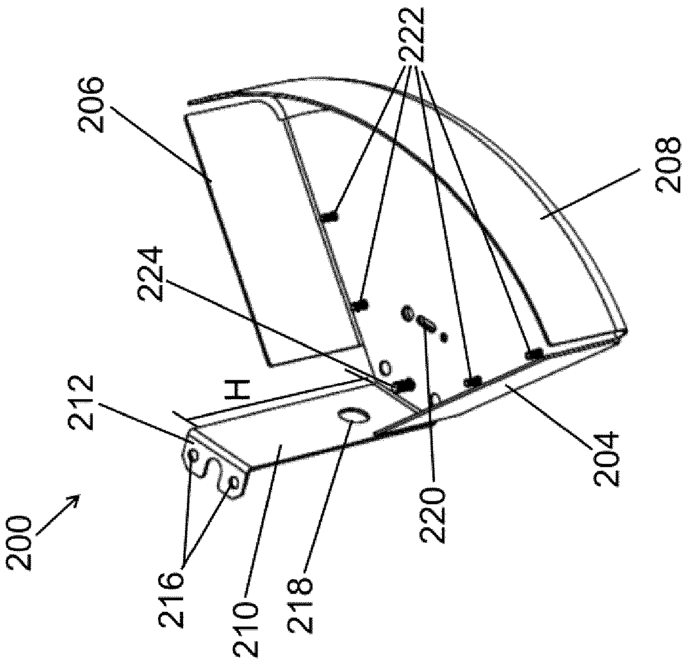
FIGS. 2A-2C illustrate different views of a heat sink structure corresponding to the heat sink structures of the light fixture of FIG. 1A according to an example embodiment.
Figure 2A:
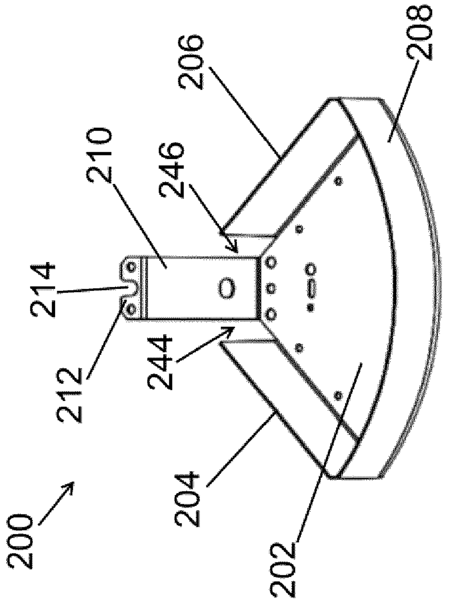
Figure 2C:
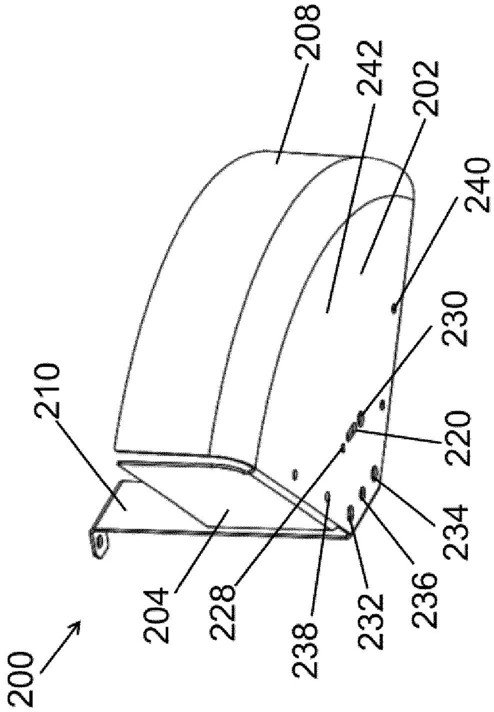

FIGS. 2A-2C illustrate different views of a heat sink structure 200 corresponding to the heat sink structures 102, 104, 106, 108 of the light fixture 100 of FIG. 1A according to an example embodiment. References to the heat sink structure 200 and elements of the heat sink structure 200 below are applicable to the heat sink structures 102, 104, 106, 108. Referring to FIGS. 1A-2C, in some example embodiments, the heat sink structure 200 includes a bottom wall 202 and side walls 204, 206, 208, 210 that extend up from the bottom wall 202. For example, the side walls 204, 206, 208, 210 may extend up at the outer perimeters of the bottom wall 202. The bottom wall 202 may be wider at the side wall 208 than at the side wall 210 such that side walls 204 and 206 are closer to each other at the side wall 210 than at the side wall 208.

In some example embodiments, the side walls 204, 206 may extend up a 90-degree angle with respect to the bottom wall 202. Alternatively, the side walls 204, 206 may be slanted with respect to the bottom wall 202. For example, each side wall 204, 206 may be slanted outwardly (i.e., away from each other) at an angle that is in a range of approximately 91 to 95 degrees (e.g., 91 degrees, 92 degrees, etc.) with respect to the bottom wall 202. In some example embodiments, the side walls 208, 210 may also extend up vertically or slanted from the bottom wall 202.

In some example embodiments, the side wall 210 may be longer than the other side walls 204, 206, 208. For example, the heat sink structure 200 may include a flange 212 that extends out from the side wall 210. The flange 212 may include attachment holes 216, and fasteners (e.g., screws) may be extended through the attachment holes to attach the flange 212 to the electronics housing 110 of the light fixture 100. The attachment of the flange 212 to the electronics housing 110 effectively attaches the heat sink structure 200 to the electronics housing 110. The attachment of the flange 212 to the electronics housing 110 also results in the bottom wall 202 of the heat sink structure 200 being spaced from the electronics housing 110 by at least the height H of the side wall 210. For example, the flange 212 may extend out from the side wall 210 horizontally or at a slanted upward direction.

In some example embodiments, the side wall 210 includes a routing hole 218, and the flange 212 includes a routing slot 214. An electrical cable may be routed between the electronics housing 110 and a light source through the routing slot 214 and the routing hole 218. For example, a light source may be attached to a surface 242 of the bottom wall 202 of the heat sink structure 200. To illustrate, the heat sink structure 200 may correspond to the sink structure 102 shown in FIGS. 1A and 1B, and the light source 132 may be attached to a surface of the bottom wall of the heat sink structure 102.

In some example embodiments, the heat sink structure 200 has holes formed in the bottom wall 202. For example, a hole 220 in the bottom wall 202 may be used to extend the electrical cable routed through the routing hole 218 to the light source. Holes in the bottom wall 202 close to the side walls 204, 206, such as holes 238, 240, may be used to attach a lens, such as the lens 112, to the bottom wall 202 of the heat sink structure 200 using fasteners 222 (e.g., screws). For example, the fasteners 222 may correspond to the fasteners 148 shown in FIG. 1A. The heat sink structure 200 may also include holes 228, 230, 232, 234, 236 that may be used in securely attaching a retaining structure (for example, a retaining structure 402 shown in FIG. 4) to the bottom wall 202 of the heat sink structure 200. A fastener 224 that extends up through the hole 236 may be one of several fasteners or structures that may be used to securely attach the retaining structure to the heat sink structure 200. Attachment structures of the retaining structure may also be inserted into the holes 228, 230, 232, 234. The fasteners 222 may also be inserted into corresponding holes in the retaining structure to securely attach the retaining structure to the heat sink structure 200. Alternatively or in addition, a respective screw nut may be attached to the individual fasteners 222.

In some example embodiments, the side wall 208 may be curved as it extends between the side wall 204 and the side wall 206. The side wall 208 may be curved such that the side wall 208 is a segment of a circular perimeter that is formed by an assembly of multiple ones of the heat sink structure 200. To illustrate, the side wall of each heat sink structure 102, 104, 106, 108 of the light fixture 100 corresponding to the side wall 208 of the heat sink structure 200 may be a segment of a perimeter of a circular shape formed by the assembly of the heat sink structures 102, 104, 106, 108 as shown in FIG. 1A.

Figure 4:
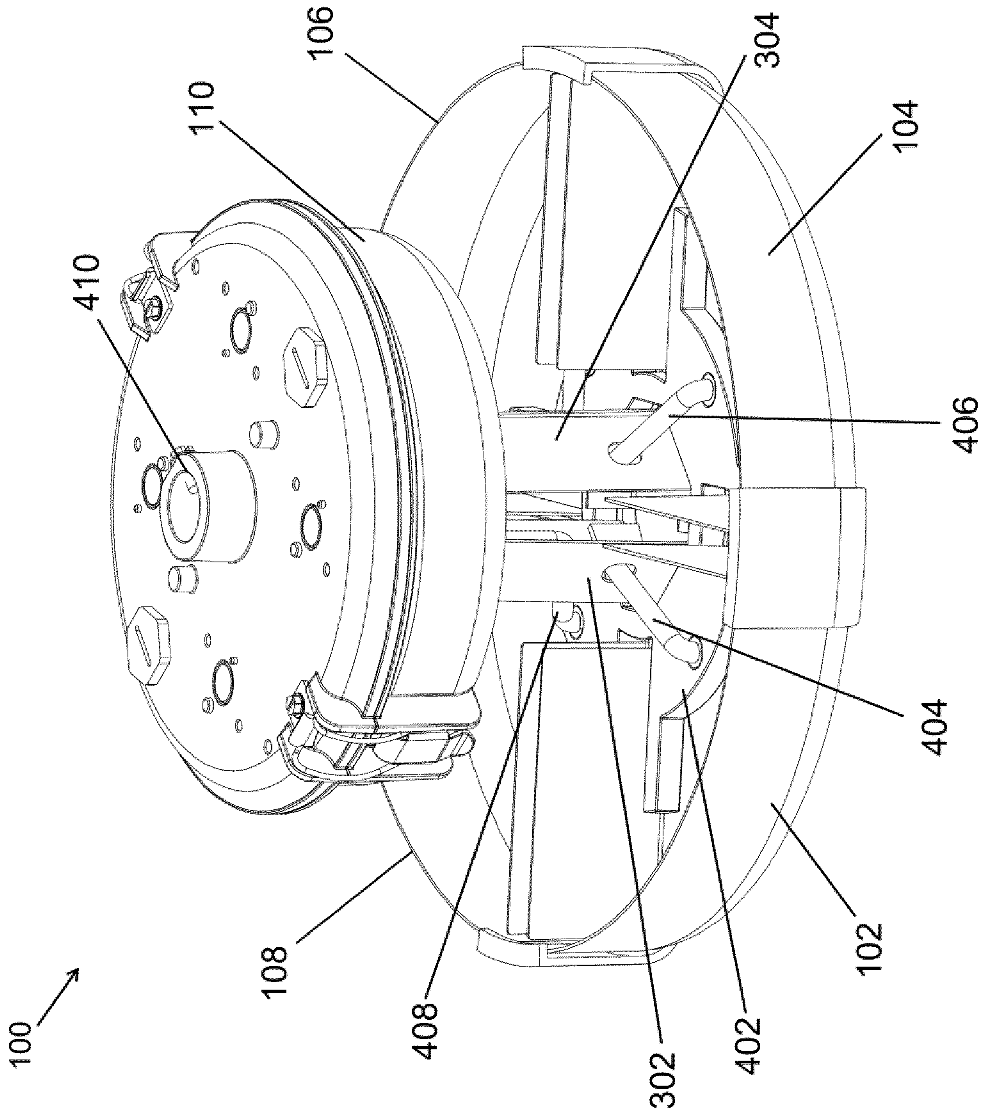
FIG. 4 illustrates a perspective view of the high bay light fixture of FIG. 1A according to an example embodiment.
Figure 7:
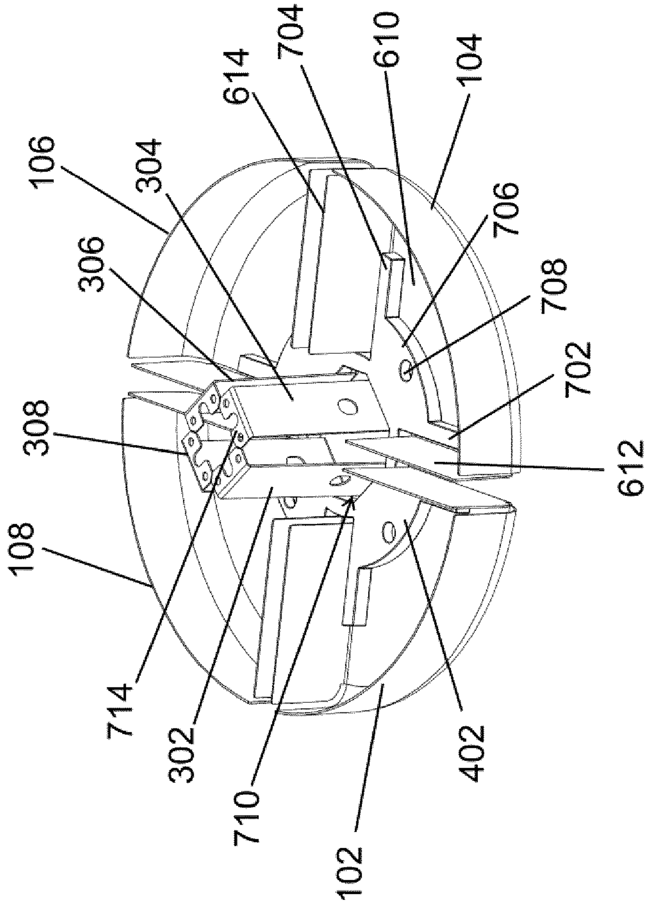
FIG. 7 illustrates an assembly of a retaining structure and the heat sink structures of the high bay light fixture of FIG. 1A according to an example embodiment.

In some example embodiments, the side wall 208 and the side wall 204 may be separated by a gap at one end of the side wall 208, and the side wall 208 and the side wall 206 may be separated by another gap at another end of the side wall 208. The side wall 204 also may be separated from the side wall 210 by a gap 244 at an opposite end from the side wall 208, and the side wall 206 may be separated from the side wall 210 by a gap 246 at an opposite end from the side wall 208. The gaps 244, 246 may allow a retaining structure, such as the retaining structure 402 shown in FIG. 4, to be placed on the bottom wall 202 and around the wide wall 210 in a similar manner as shown in FIGS. 4 and 7 with respect to the heat sink structures 102, 104, 106, 108.

In some alternative embodiments, the heat sink structure 200 may have a different shape than shown without departing from the scope of this disclosure. For example, each one of the walls of the heat sink structure 200 may have a different shape than shown. In some alternative embodiments, one or more of the holes in the bottom wall 202, in the side wall 210, and/or in the flange 212 may be at a different location than shown without departing from the scope of this disclosure. In some alternative embodiments, one or more of the holes in the bottom wall 202, in the side wall 210, and/or in the flange 212 may be omitted without departing from the scope of this disclosure. In some alternative embodiments, the flange 212 may be omitted and the side wall 210 may be attached to the electronics housing 110 using other means as can be readily understood by those of ordinary skill in the art with the benefit of the scope of this disclosure.

Figure 3:
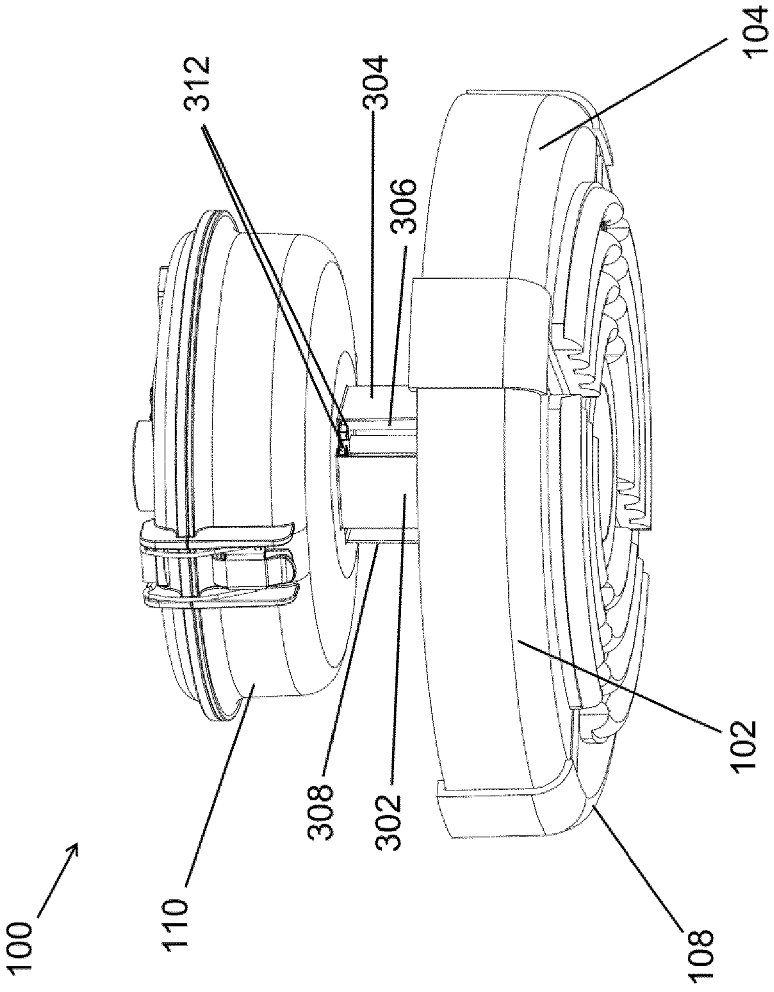
FIG. 3 illustrates a side perspective view of the high bay light fixture of FIG. 1A according to an example embodiment.

FIG. 3 illustrates a side perspective view of the high bay light fixture 100 of FIG. 1A according to an example embodiment. Referring to FIGS. 1A-3, in some example embodiments, the heat sink structure 102 includes a side wall 302 that corresponds to the side wall 210 of the heat sink structure 200 shown in FIG. 2, the heat sink structure 104 includes a side wall 304 that corresponds to the side wall 210 of the heat sink structure 200 shown in FIG. 2, the heat sink structure 106 includes a side wall 306 that corresponds to the side wall 210 of the heat sink structure 200 shown in FIG. 2, and the heat sink structure 108 includes a side wall 308 that corresponds to the side wall 210 of the heat sink structure 200 shown in FIG. 2.

In some example embodiments, the flange of each side wall of the heat sink structures 102, 104, 106, 108 corresponding to the flange 212 of the heat sink structure 200 may be attached to the electronics housing 110 using fasteners such as fasteners 312 shown in FIG. 3. The bottom wall of each heat sink structure 102, 104, 106, 108 corresponding to the bottom wall 202 of the heat sink structure 200 may be spaced from the electronics housing 110 by the height of the corresponding side walls 302, 304, 306, 308. Because the side walls 302, 304, 306, 308 of the heat sink structures 102, 104, 106, 108 are longer than the other side walls of the heat sink structures 102, 104, 106, 108, the impact of heat dissipated from the surfaces of the other side walls of the heat sink structures 102, 104, 106, 108 on components inside the electronics housing 110 is reduced.

FIG. 4 illustrates a top perspective view of the high bay light fixture 100 of FIG. 1A according to an example embodiment. Referring to FIGS. 1A-4, in some example embodiments, the heat sink structure 102 includes a retaining structure 402 that is positioned on the bottom wall of each heat sink structure 102, 104, 106, 108 corresponding to the bottom wall 202 of the heat sink structure 200 of FIG. 2. The retaining structure 402 is also positioned around the side walls 302, 304, 306, 308 of the heat sink structures 102, 104, 106, 108. For example, the retaining structure 402 may serve to reduce movements of the individual heat sink structures 102, 104, 106, 108 to minimize changes in the relative positions of the heat sink structures 102, 104, 106, 108 with respect to each other. The retaining structure 402 may be made from aluminum and/or another suitable material using methods such as die casting as can be readily understood by those of ordinary skill in the art with the benefit of the scope of this disclosure.

In some example embodiments, the retaining structure 402 may include holes for routing electrical cables between the electronics housing 110 and the light sources of the individual heat sink structures 102, 104, 106, 108. For example, an electrical cable 404 may be routed through a hole in the retaining structure 402, between the electronics housing 110 and the light source 132 attached to the bottom wall of the heat sink structure 102 corresponding to the bottom wall of the heat sink structure 200 of FIG. 2. As shown in FIG. 1B, the light source 132 is attached to the surface of the bottom wall of the heat sink structure 102 facing away from the electronics housing 110. As another example, an electrical cable 406 may be routed through another hole in the retaining structure 402, between the electronics housing 110 and the light source 134 attached to the bottom wall of the heat sink structure 104. As shown in FIG. 1B, the light source 134 is attached to the surface of the bottom wall of the heat sink structure 104 facing away from the electronics housing 110. As another example, an electrical cable 408 may be routed through another hole in the retaining structure 402, between the electronics housing 110 and the light source 138 attached to the bottom wall of the heat sink structure 108. As shown in FIG. 1B, the light source 138 is attached to the surface of the bottom wall of the heat sink structure 108 facing away from the electronics housing 110. Another electrical cable may be similarly routed through another hole in the retaining structure 402, between the electronics housing 110 and the light source 136 attached to the bottom wall of the heat sink structure 106.

In some example embodiments, the light fixture 100 may be suspended, for example, from a ceiling structure. For example, one or more cables (not shown) that may be used for suspending the light fixture 100 from a ceiling structure may be attached to an attachment structure 410 of the electronics housing 110. One or more electrical wires may also be routed into the cavity of the electronics housing 110 via a passageway in the attachment structure as can be readily understood by those of ordinary skill in the art with the benefit of the scope of this disclosure.

In some alternative embodiments, the electrical cables may be routed between the electronics housing 110 and the light sources of the heat sink structures 102, 104, 106, 108 in a different manner than shown without departing from the scope of this disclosure. In some alternative embodiments, the retaining structure 402 may be omitted or replaced by one or more other structures without departing from the scope of this disclosure. In some example embodiments, the electronics housing 110 may have a different shape and/or components/features than shown without departing from the scope of this disclosure.

Figure 5:
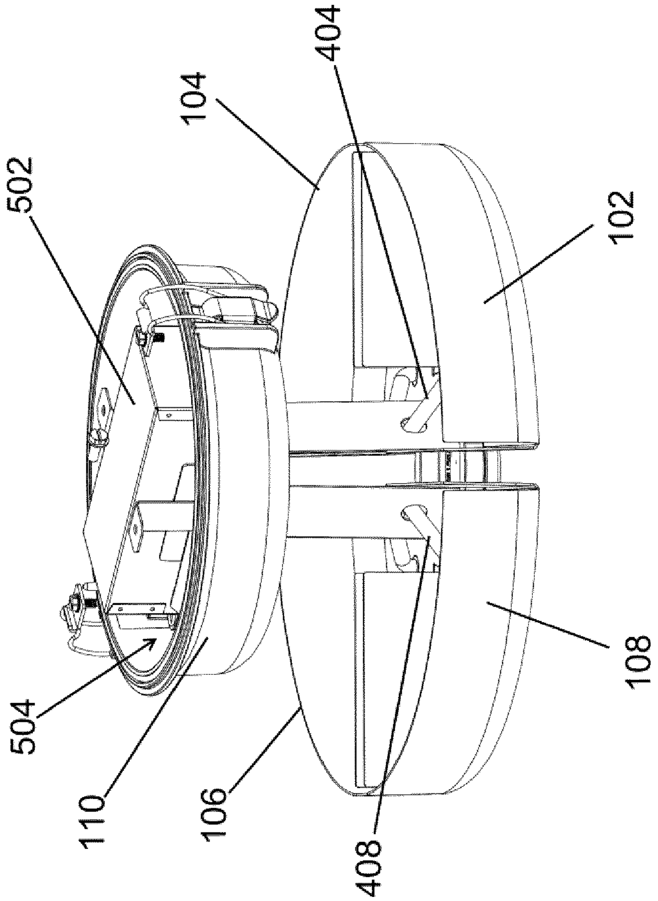
FIG. 5 illustrates a side perspective view of the high bay light fixture of FIG. 1A with a driver of the light fixture shown according to an example embodiment.

FIG. 5 illustrates a side perspective view of the high bay light fixture of FIG. 1A with a driver 502 of the light fixture shown according to an example embodiment. Referring to FIGS. 1A-5, in some example embodiments, the driver 502 of the light fixture 100 is positioned in a cavity 504 of the electronics housing 110. The driver 502 provides power to the light sources 132, 134, 136, 138 attached to the heat sink structures 102, 104, 106, 108. For example, the driver 502 may provide power to the light source 132 via the electrical cable 404. As another example, the driver 502 may provide power to the light source 134 via the electrical cable 406.

In some alternative embodiments, the gap cover pieces 122, 124, 126, 128 shown in FIG. 1A may be omitted as shown in FIG. 5. In some alternative embodiments, other electronics components may be positioned in the cavity 504 of the electronics housing 110. In some alternative embodiments, the driver 502 may have a different shape or may be at a different location than shown without departing from the scope of this disclosure.

Figure 6:
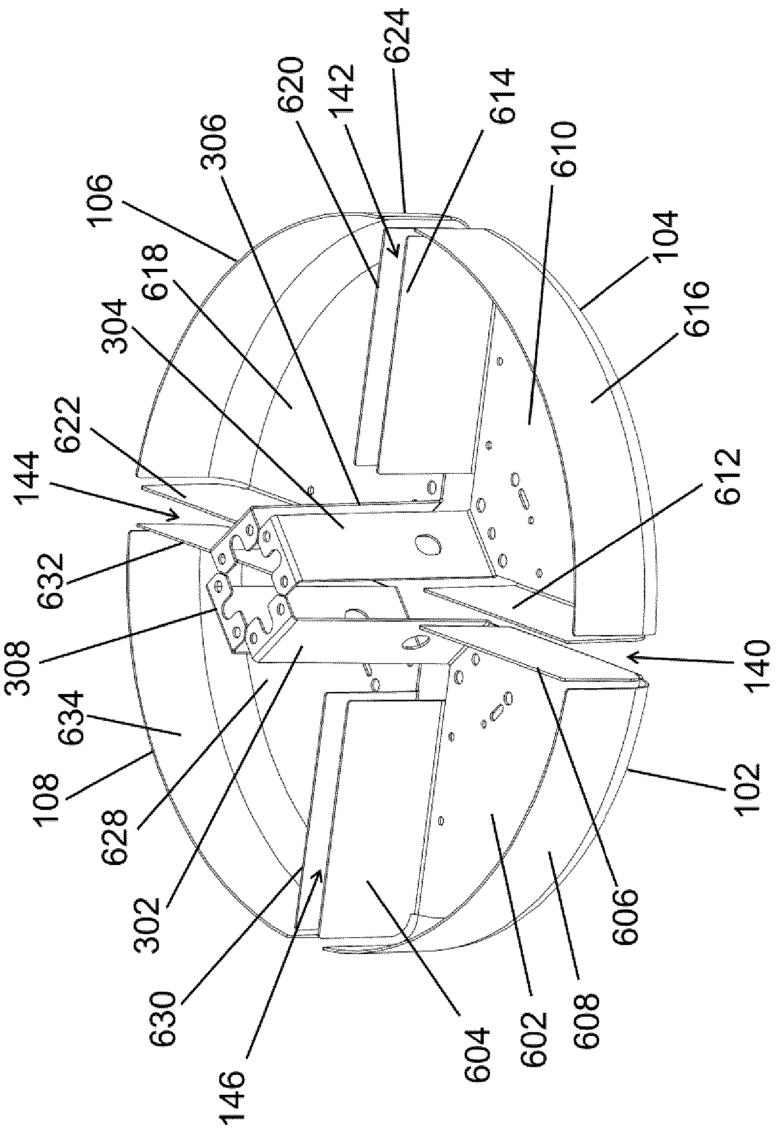
FIG. 6 illustrates an assembly of the heat sink structures of the high bay light fixture of FIG. 1A according to an example embodiment.

FIG. 6 illustrates an assembly of the heat sink structures 102, 104, 106, 108 of the high bay light fixture of FIG. 1A according to an example embodiment. As described above, each heat sink structure 102, 104, 106, 108 may correspond to the heat sink structure 200 shown in FIG. 2. Referring to FIGS. 1A-6, in some example embodiments, the heat sink structure 102 includes a bottom wall 602 and side walls 604, 606, 608, 302 that extend up from the bottom wall 602. The heat sink structure 104 may include a bottom wall 610 and side walls 612, 614, 616, 304 that extend up from the bottom wall 610. The heat sink structure 106 may include a bottom wall 618 and side walls 620, 622, 624, 306 that extend up from the bottom wall 618. The heat sink structure 108 may include a bottom wall 628 and side walls 630, 632, 634, 308 that extend up from the bottom wall 628.

In some example embodiments, the side wall 606 is adjacent to the side wall 612 and is spaced from the side wall 612 by the convection channel 140 that provides a path for air to flow upward between the side wall 606 and the side wall 612. For example, the side wall 606 may be at 90-degrees with respect to the bottom wall 602, and the side wall 612 may be at 90-degrees with respect to the bottom wall 610. Alternatively, the side wall 606 and the side wall 612 may be slanted toward each other, which may produce the Bernoulli effect and thus facilitate heat dissipation from the heat sink structures 102, 104. For example, the side wall 606 and the side wall 612 may extend up at an angle in a range of 91 to 95 degrees or larger with respect to the bottom wall 602 and the bottom wall 610, respectively. The convection channel 140 may extend for the entire lengths of the side walls 606, 612.

In some example embodiments, the side wall 614 is adjacent to the side wall 620 and is spaced from the side wall 620 by a convection channel 142 that provides a path for air to flow upward between the side wall 614 and the side wall 620. For example, the side wall 614 may be at 90-degrees angle with respect to the bottom wall 610, and the side wall 620 may be at 90-degrees angle with respect to the bottom wall 618. Alternatively, the side wall 614 and the side wall 620 may be slanted toward each other, which may produce the Bernoulli effect and thus facilitate heat dissipation from the heat sink structures 104, 106. For example, the side wall 614 and the side wall 620 may extend up at an angle in a range of 91 to 95 degrees or larger with respect to the bottom wall 610 and the bottom wall 618, respectively. The convection channel 142 may extend for the entire lengths of the side walls 618, 620.

In some example embodiments, the side wall 622 is adjacent to the side wall 632 and is spaced from the side wall 632 by a convection channel 144 that provides a path for air to flow upward between the side wall 622 and the side wall 632. For example, the side wall 622 may be at 90-degrees angle with respect to the bottom wall 618, and the side wall 632 may be at 90-degrees angle with respect to the bottom wall 628. Alternatively, the side wall 622 and the side wall 632 may be slanted toward each other, which may produce the Bernoulli effect and thus facilitate heat dissipation from the heat sink structures 106, 108. For example, the side wall 622 and the side wall 632 may extend up at an angle in a range of 91 to 95 degrees or larger with respect to the bottom wall 618 and the bottom wall 628, respectively. The convection channel 144 may extend for the entire lengths of the side walls 622, 632.

In some example embodiments, the side wall 630 is adjacent to the side wall 604 and is spaced from the side wall 604 by a convection channel 146 that provides a path for air to flow upward between the side wall 630 and the side wall 604. For example, the side wall 630 may be at 90-degrees angle with respect to the bottom wall 628, and the side wall 604 may be at 90-degrees angle with respect to the bottom wall 602. Alternatively, the side wall 630 and the side wall 604 may be slanted toward each other, which may produce the Bernoulli effect and thus facilitate heat dissipation from the heat sink structures 108, 102. For example, the side wall 630 and the side wall 604 may extend up at an angle in a range of 91 to 95 degrees or larger with respect to the bottom wall 628 and the bottom wall 602, respectively. The convection channel 146 may extend for the entire lengths of the side walls 630, 604.

In some example embodiments, the side walls 608, 616, 624, 634, which correspond to the side wall 208 of the heat sink structure 200, may be curved such that the side walls 608, 616, 624, 634 are segments of a circular perimeter that is formed by an assembly of multiple ones of the heat sink structure 200. In general, the heat sink structures 102, 104, 106, 108 may be arranged a circular configuration as shown in FIG. 6.

FIG. 7 illustrates an assembly of a retaining structure and the heat sink structures of the high bay light fixture of FIG. 1A according to an example embodiment. Referring to FIGS. 1A-7, in some example embodiments, the retaining structure 402 is positioned on the bottom walls of the heat sink structures 102, 104, 106, 108. To illustrate, a section 706 of the retaining structure 402 may be positioned on a portion of the bottom wall 610 of the heat sink structure 104 as shown in FIG. 7. For example, the section 706 may include protruding structures 702 and 704 that are proximal to the side walls 612 and 614 of the heat sink structure 104, respectively. For example, the protruding structures 702 704 may each provide structural support to the respective side wall 612, 614. The section 706 of the retaining structure 402 may also include a hole 708 that can be used to route the electrical cable 406 (shown in FIGS. 4 and 5) to the light source 134 that is attached to the bottom wall 610 on an opposite side of the bottom wall 610 from the section 706. Other sections of the retaining structure 402 may be similarly positioned on the bottom wall of the other heat sink structures 102, 106, 108. Other protruding structures of the retaining structure 402 that are similar to the protruding structures 702, 704 may be positioned on the bottom wall of a respective one of the other heat sink structures 102, 106, 108 and may similarly provide structural support to the side walls of the heat sink structures 102, 106, 108.

In some example embodiments, the side walls 302, 304, 306, 308 of the heat sink structures 102, 104, 106, 108 may extend through an opening 710 of the retaining structure 402 such that the retaining structure 402 is positioned around the side walls 302, 304, 306, 308. The retaining structure 402 may serve to reduce movements of the individual heat sink structures 102, 104, 106, 108.

In some example embodiments, the flange extending from each side wall 302, 304, 306, 308 may correspond to the flange 212 of the heat sink structure 200. For example, a flange 714 extending from the side wall 304 may correspond to the flange 212 of the heat sink structure 200 and may be attached to the electronics housing 110 using one or more fasteners (e.g., the fasteners 312 shown in FIG. 3). The attachment of the flange 714 to the electronics housing 110 (e.g., a bottom wall of the electronics housing 110) effectively attaches the heat sink structure 104 to the electronics housing 110. The flanges of the other side walls 302, 306, 308 may similarly be attached to the electronics housing 110 using fasteners (e.g., the fasteners 312 shown in FIG. 3) that extend through the holes in the flanges. The heat sink structures 102, 106, 108 may be effectively attached to the electronics housing 110 by the attaching the flange of the respective heat sink structures 102, 106, 108 to the electronics housing 110.

In some alternative embodiments, the retaining structure 402 may be omitted without departing from the scope of this disclosure. In some alternative embodiments, the retaining structure 402 may have a different shape than shown without departing from the scope of this disclosure. In some alternative embodiments, one or more of the protruding structures of the retaining structure 402 may be omitted without departing from the scope of this disclosure. In some alternative embodiments, the flanges of the heat sink structures 102, 104, 106, 108 may have a different shape than shown without departing from the scope of this disclosure.

Figure 8:
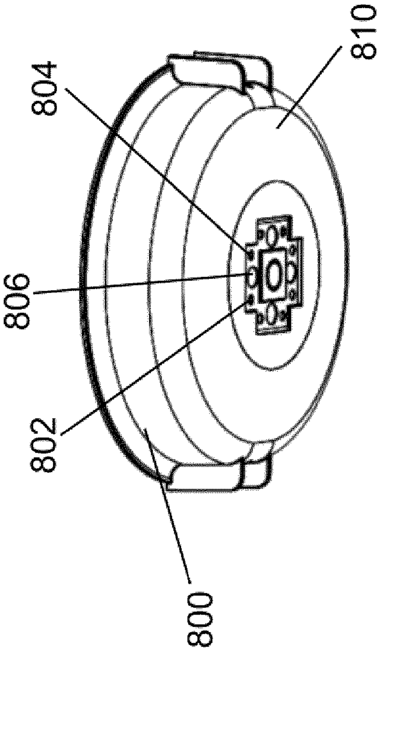
FIG. 8 illustrates a bottom perspective view of a container unit of the electronics housing of the high bay light fixture of FIG. 1A according to an example embodiment.

FIG. 8 illustrates a bottom perspective view of a container unit 800 of the electronics housing 110 of the high bay light fixture 100 of FIG. 1A according to an example embodiment. Referring to FIGS. 1A-8, in some example embodiments, the electronics housing 110 includes the container unit 800. The container unit 800 may include a base 810 that has holes 802, 804 for attaching to the container unit 800 the flanges of the heat sink structures 102, 104, 106, 108 corresponding to the flange 212 of the heat sink structure 200. Fasteners, such as the fasteners 312 shown in FIG. 3, may extend through the holes in the flanges of the heat sink structures 102, 104, 106, 108 corresponding to the holes 216 in the flange 212 of the heat sink structure 200 to attach the flanges to the container unit 800 of the electronics housing 110. For example, holes in the flange 714 of the heat sink structure 104 shown in FIG. 7 may be aligned with the holes 802, 804 of the container base 800 such that fasteners (e.g., a screws) can extend through the holes to attach the flange 714 to the container unit 800 of the electronics housing 110. The flanges of the other heat sink structures 102, 106, 108 may be attached to the container unit 800 in a similar manner using fasteners that extend through aligned holes in the flanges and the container unit 800.

In some example embodiments, the base 810 of the container unit 800 includes holes, such as a hole 806, for routing electrical cables between the driver 502 in the cavity 504 of the electronics housing 110 and the light sources attached to the heat sink structures 102, 104, 106, 108. For example, the electrical cable 406 (shown in FIG. 4) extending between the driver 502 and the light source 134 (shown in FIG. 1B) may be routed through the hole 806 (shown in FIG. 8). Other electrical cables that are used to provide power to the light sources of the other heat sink structures 102, 106, 108 may be routed through similar holes in the base 810 of the container unit 800.

In some alternative embodiments, the container unit 800 may have more or fewer holes than shown without departing from the scope of this disclosure. In some alternative embodiments, the holes in the base 810 of the container unit 800 may be at different locations than shown without departing from the scope of this disclosure. In some alternative embodiments, the container unit 800 may have a different shape than shown without departing from the scope of this disclosure.

Figure 9B:
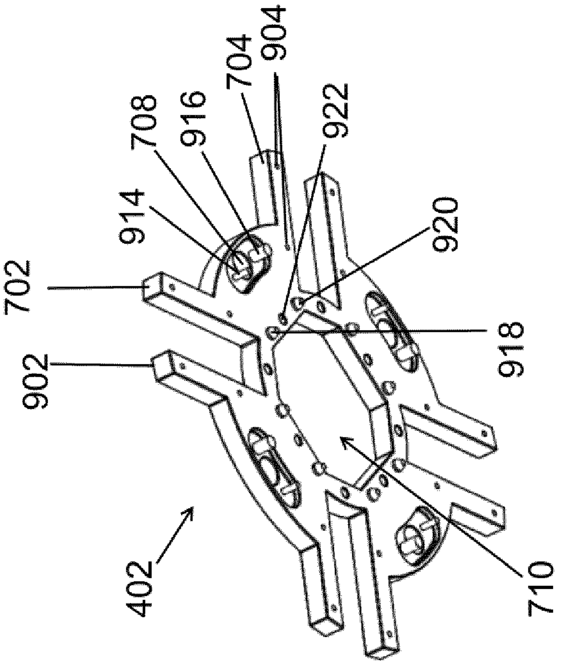
FIG. 9B illustrates a bottom perspective view of the retaining structure of the light fixture of FIG. 1A according to another example embodiment.
Figure 9A:
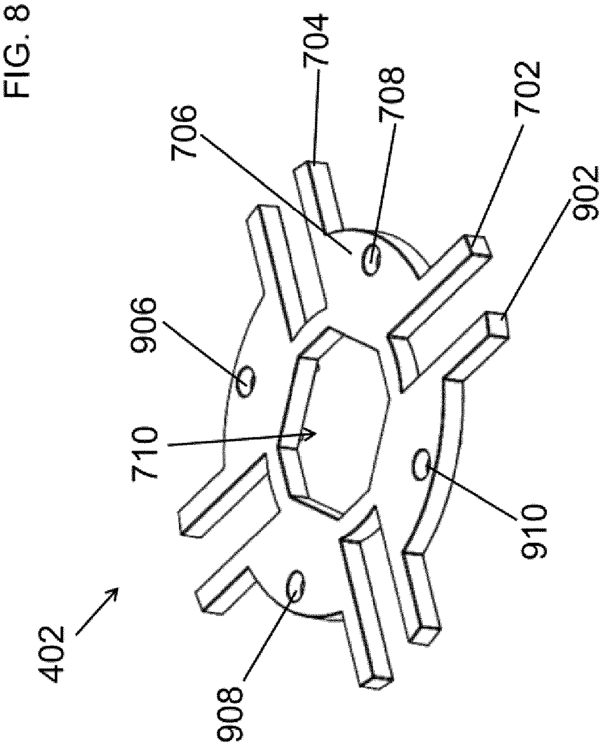
FIG. 9A illustrates a top perspective view of the retaining structure of the light fixture of FIG. 1A according to another example embodiment.

FIG. 9A illustrates a top perspective view of the retaining structure 402 of the light fixture of 100 FIG. 1A according to another example embodiment, and FIG. 9B illustrates a bottom perspective view of the retaining structure 402 of the light fixture 100 of FIG. 1A according to another example embodiment. Referring to FIGS. 1A-9B, in some example embodiments, the retaining structure 402 includes multiple protruding structures such as the protruding structures 702, 704. As described above with respect to the protruding structures 702, 704, the protruding structures may be positioned close to the side walls of the heat sink structures 102, 104, 106, 108 and provide structural support to the side walls. As an example, a protruding structure 902 may be positioned on the bottom wall 602 of the heat sink structure 102 and may provide structural support to the side wall 606 of the heat sink structure 102.

In some example embodiments, the retaining structure 402 has the opening 710, and the side wall 302, 304, 306, 308 corresponding to the side wall 210 of the heat sink structure 200 may extend through the opening 710 as shown in FIG. 7. The retaining structure 402 may also include the hole 708 and holes 906, 908, 910 that are used to route electrical cables to the light sources of the heat sink structures 102, 104, 106, 108 as described with respect to the hole 708. The holes 708, 906, 908, 910 are located in the respective sections of the retaining structure 402 that are positioned on the bottom walls of the heat sink structures 102, 104, 106, 108.

In some example embodiments, the retaining structure 402 includes attachment structures that protrude out on the side of the retaining structure 402 facing the bottom walls of the heat sink structures 102, 104, 106, 108. For example, the retaining structure 402 may include attachment structures 914, 916, 918, 920 that protrude out on the side of the retaining structure 402 facing the bottom wall 610 of the heat sink structure 104. The attachment structures may be inserted into corresponding holes in the bottom walls of the heat sink structures 102, 104, 106, 108. To illustrate with respect to the heat sink structure 200 shown in FIG. 2, which represents the heat sink structures 102, 104, 106, 108, the attachment structures 914 and 916 may be inserted into the holes 228 and 230, respectively, and the attachment structures 918 and 920 may be inserted into the holes 232 and 234, respectively.

In some example embodiments, the retaining structure 402 may include holes that are used to securely attach the heat sink structures 102, 104, 106, 108 to the retaining structure 402 using fasteners. To illustrate with respect to the heat sink structure 200 shown in FIG. 2, the retaining structure 402 may include a hole 922, and the fastener 224 that extends through the hole 236 in the bottom wall 202 of the heat sink structure 200 may be inserted into the hole 922 to securely attach the heat sink structure 200 to the retaining structure 402. As shown in FIG. 9B, the retaining structure 402 may include multiple holes located at the different sections of the retaining structure 402.

In some example embodiments, fasteners that are used to attach a lens to the heat sink structure 200 may also be inserted into holes in the protruding structures of the retaining structure 402 to more securely attach the heat sink structure 200 to the retaining structure 402. For example, the fasteners 222 shown in FIG. 2 may be inserted into holes, such as holes 904, in the protruding structure 702 of the retaining structure 402.

In some alternative embodiments, the retaining structure 402 may have a different shape than shown without departing from the scope of this disclosure. In some alternative embodiments, one or more holes of the retaining structure 402 may be omitted without departing from the scope of this disclosure. In some alternative embodiments, some of the holes of the retaining structure 402 may be at different locations than shown without departing from the scope of this disclosure. In some alternative embodiments, the opening 710 may have a different shape than shown without departing from the scope of this disclosure.

Figure 10B:
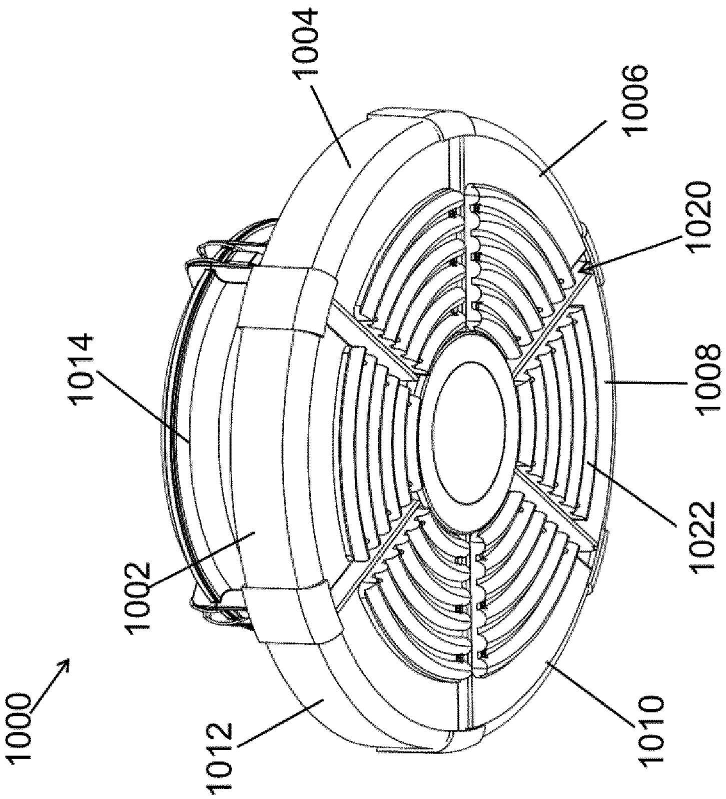
FIGS. 10A and 10B illustrate different views of a high bay light fixture according to another example embodiment.
Figure 10A:
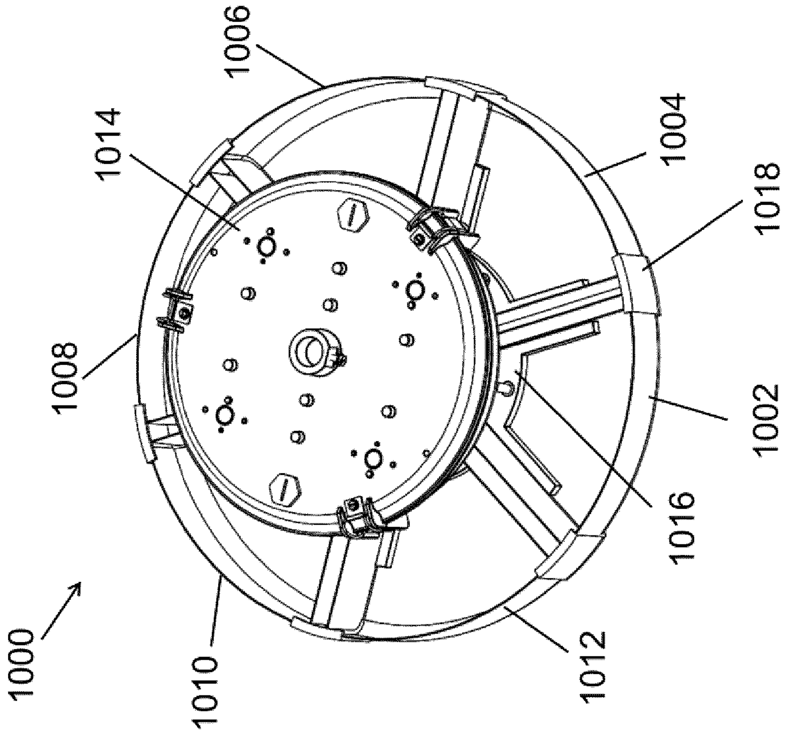

FIGS. 10A and 10B illustrate different views of a high bay light fixture 1000 according to another example embodiment. In some example embodiments, the light fixture 1000 is similar to the light fixture 100 of FIG. 1A. In contrast to the light fixture 100, the light fixture 1000 includes six heat sink structures instead of four heat sink structures. To illustrate, the light fixture 1000 may include heat sink structures 1002, 1004, 1006, 1008, 1010, 1012 that each have a bottom wall and side walls that correspond to the bottom wall and side walls of the heat sink structure 200 of FIG. 2. In general, the heat sink structures 1002, 1004, 1006, 1008, 1010, 1012 are similar to the heat sink structures 102, 104, 106, 108, with the primary differences being related to dimensions. For example, the heat sink structures 1002, 1004, 1006, 1008, 1010, 1012 may be sized such that the heat sink structures 1002, 1004, 1006, 1008, 1010, 1012 can be arranged in a circular configuration in a similar manner as described with respect to the heat sink structures 102, 104, 106, 108 of the light fixture 100.

Light sources are attached to the heat sink structures 1002, 1004, 1006, 1008, 1010, 1012 in a similar manner as described with respect to the light fixture 100. Lenses, such as a lens 1022, are also attached to respective ones of the heat sink structures 1002, 1004, 1006, 1008, 1010, 1012 in a similar manner as described with respect to the light fixture 100.

The heat sink structures 1002, 1004, 1006, 1008, 1010, 1012 are also arranged such that a convection channel, such as a convection channel 1020, exists between adjacent ones of the heat sink structures 1002, 1004, 1006, 1008, 1010, 1012 in a similar manner as described with respect to the light fixture 100. Gap cover pieces, such as a gap cover piece 1018, may cover the convection channels between adjacent heat sink structures in a similar manner as described with respect to the light fixture 100.

In some example embodiments, the light fixture 1000 includes an electronics housing 1014 that may contain a driver (e.g., an LED driver) similar to the driver 502 shown in FIG. 5. The side walls of the heat sink structures 1002, 1004, 1006, 1008, 1010, 1012 corresponding to the side wall 210 of the heat sink structure 200 of FIG. 2 may be attached to the electronics housing 1014 in a similar manner as described with respect to the heat sink structures 102, 104, 106, 108. The driver may provide power to the light sources that are attached to the heat sink structures 1002, 1004, 1006, 1008, 1010, 1012 in a similar manner as described with respect to the light fixture 100. The light fixture 1000 may also include a retaining structure 1016 that is attached to the heat sink structures 1002, 1004, 1006, 1008, 1010, 1012 in a similar manner as described with respect to the retaining structure 402 of the light fixture 100.

In some example embodiments, the heat sink structures 1002, 1004, 1006, 1008, 1010, 1012 may be made from sheet metal (e.g., aluminum sheet metal) using methods such as stamping, etc. as can be readily understood by those of ordinary skill in the art with the benefit of the scope of this disclosure. The retaining structure 1016 and the electronics housing 1014 may be made from a metal such as aluminum using methods such die casting, etc. as can be readily understood by those of ordinary skill in the art with the benefit of the scope of this disclosure.

In some alternative embodiments, the light fixture 1000 may include more or fewer heat sink structures than shown without departing from the scope of this disclosure. In some alternative embodiments, the heat sink structures of the light fixture 100 may be arranged in a different configuration than shown without departing from the scope of this disclosure. In some alternative embodiments, the light fixture 1000 may include components other than shown without departing from the scope of this disclosure. In some alternative embodiments, one or more components (e.g., the retaining structure 1016) of the light fixture 1000 may be omitted without departing from the scope of this disclosure.

Although particular embodiments have been described herein in detail, the descriptions are by way of example. The features of the embodiments described herein are representative and, in alternative embodiments, certain features, elements, and/or steps may be added or omitted. Additionally, modifications to aspects of the embodiments described herein may be made by those skilled in the art without departing from the scope of the following claims, the scope of which are to be accorded the broadest interpretation so as to encompass modifications and equivalent structures.

The invention claimed is:

1. A high bay light fixture, comprising:

an electronics housing;

multiple heat sink structures attached to the electronics housing, wherein each heat sink structure of the multiple heat sink structures is adjacent to two other heat sink structures of the multiple heat sink structures; and light sources attached to the multiple heat sink structures, wherein each heat sink structure includes a bottom wall and side walls that extend up from the bottom wall, wherein each light source is attached to the bottom wall of a respective heat sink structure of the multiple heat sink structures on a surface of the bottom wall facing away from the electronics housing, wherein each heat sink structure is spaced from other heat sink structures of the multiple heat sink structures that are adjacent to the heat sink structure, wherein the bottom wall of each heat sink structure is spaced from the electronics housing by at least a height of a side wall of the side walls of each heat sink structure, and wherein (a), the side wall of the side walls of each heat sink structure includes a hole for routing an electrical cable between the electronic housing and the light source attached to the heat sink structure, or (b), the multiple heat sink structures are made from aluminum sheet metal.

2. The light fixture of claim 1, wherein a flange extends out from the side wall of the side walls of each heat sink structure and wherein the flange is attached to the electronics housing.

3. The light fixture of claim 1, further comprising a retaining structure positioned on the bottom wall of each heat sink structure, wherein the side wall of the side walls of each heat sink structure extends through an opening of the retaining structure.

4. The light fixture of claim 1, wherein a first side wall (606) of a first heat sink structure of the multiple heat sink structures is spaced (140) from a side wall of a second heat sink structure (104) of the multiple heat sink structures that is adjacent to the first heat sink structure and wherein a second side wall of the first heat sink structure of the multiple heat sink structures is spaced (146) from a side wall of a third heat sink structure of the multiple heat sink structures that is adjacent to the first heat sink structure.

5. The light fixture of claim 4, wherein the first side wall (606) of the first heat sink structure of the multiple heat sink structures is slanted toward the side wall of the second heat sink structure (104) of the multiple heat sink structures and wherein the side wall of the second heat sink structure of the multiple heat sink structures is slanted toward the first side wall of the first heat sink structure of the multiple heat sink structures.

6. The light fixture of claim 5, wherein the second side wall of the first heat sink structure of the multiple heat sink structures is slanted toward the side wall (630) of the third heat sink structure of the multiple heat sink structures.

7. The light fixture of claim 1, wherein each heat sink structure of the multiple heat sink structures is adjacent to two other heat sink structures of the multiple heat sink structures.

8. The light fixture of claim 1, wherein a side wall of the side walls of each heat sink structure of the multiple heat sink structures is curved such that the second side wall of the side walls is a segment of a circular shape.

9. The light fixture of claim 1, further comprising lenses, wherein each lens is attached to the bottom wall of a respective heat sink structure of the multiple heat sink structures and covers the light source that is attached to the bottom wall of the respective heat sink structure.

10. The light fixture of claim 1, wherein the multiple heat sink structures include at least four heat sink structures.

11. The light fixture of claim 1, wherein the multiple heat sink structures include at least six heat sink structures.

12. The light fixture of claim 1, further comprising a driver (502) positioned in the electronics housing and configured to provide power to the light sources.

* * * * *